(12) United States Patent
Kamel et al.

(10) Patent No.: US 10,190,220 B2
(45) Date of Patent: Jan. 29, 2019

(54) FUNCTIONAL BASED REPAIR OF SUPERALLOY COMPONENTS

(71) Applicant: Siemens Energy, Inc., Orlando, FL (US)

(72) Inventors: Ahmed Kamel, Orlando, FL (US); Gerald J. Bruck, Oviedo, FL (US); Dhafer Jouini, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 1161 days.

(21) Appl. No.: 14/167,094

(22) Filed: Jan. 29, 2014

(65) Prior Publication Data
US 2014/0248512 A1 Sep. 4, 2014

Related U.S. Application Data

(63) Continuation-in-part of application No. 14/071,774, filed on Nov. 5, 2013, now abandoned, and a
(Continued)

(51) Int. Cl.
*C23C 28/02* (2006.01)
*C23C 24/10* (2006.01)
(Continued)

(52) U.S. Cl.
CPC .......... *C23C 28/021* (2013.01); *B23K 26/211* (2015.10); *B23K 26/34* (2013.01);
(Continued)

(58) Field of Classification Search
CPC ............ B23K 2201/001; B23K 26/211; B23K 26/34; C23C 24/106; C23C 28/021; F01D 5/005; Y10T 428/12986
(Continued)

(56) References Cited

U.S. PATENT DOCUMENTS 3,520,656 A * 7/1970 Yates ...................... C01B 31/36
423/345
4,192,370 A * 3/1980 Rabinovich ............ B22D 23/10
164/123
(Continued)

FOREIGN PATENT DOCUMENTS

CN 102639283 A 8/2012
EP 0764487 A1 3/1997
(Continued)

OTHER PUBLICATIONS

Translation RU2217266.*

*Primary Examiner* — Ibrahime A Abraham
*Assistant Examiner* — Frederick Calvetti

(57) ABSTRACT

A method of repairing or manufacturing a superalloy component (50) by depositing a plurality of layers (22, 24, 26, 28) of additive superalloy material having a property that is different than an underlying original superalloy material (30). The property that is changed between the original material and the additive material may be material composition, grain structure, principal grain axis, grain boundary strengthener, and/or porosity, for example. A region (60) of the component formed of the additive material will exhibit an improved performance when compared to the original material, such as a greater resistance to cracking (58).

20 Claims, 2 Drawing Sheets

Related U.S. Application Data continuation-in-part of application No. 14/144,680, filed on Dec. 31, 2013, now Pat. No. 9,770,781, and a continuation-in-part of application No. 13/956,431, filed on Aug. 1, 2013, now abandoned.

(60) Provisional application No. 61/758,795, filed on Jan. 31, 2013.

(51) Int. Cl.
    *B23K 26/34* (2014.01)
    *B23K 26/211* (2014.01)
    *F01D 5/00* (2006.01)
    *B23K 101/00* (2006.01)

(52) U.S. Cl.
    CPC ...... *C23C 24/106* (2013.01); *B23K 2101/001* (2018.08); *F01D 5/005* (2013.01); *Y10T 428/12986* (2015.01)

(58) Field of Classification Search
    USPC ............ 219/73.21, 74, 76.14, 158; 228/56.3, 228/119; 427/142, 532, 554
    See application file for complete search history.

(56) References Cited

U.S. PATENT DOCUMENTS

| | | | |
|---|---|---|---|
| 4,848,562 A * | 7/1989 | Liu | A45C 13/02 |
| | | | 150/108 |
| 6,087,022 A | 7/2000 | Burris et al. | |
| 6,248,286 B1 | 6/2001 | Lauf et al. | |
| 6,290,748 B1 * | 9/2001 | Jha | C22C 1/1036 |
| | | | 420/590 |
| 6,375,877 B2 | 4/2002 | Lauf et al. | |
| 7,033,663 B1 | 4/2006 | Hidayetoglu | |
| 2002/0113151 A1 * | 8/2002 | Forber Jones | B01J 2/02 |
| | | | 239/690 |
| 2010/0122973 A1 * | 5/2010 | Sassatelli | B23K 31/02 |
| | | | 219/130.21 |
| 2011/0139394 A1 * | 6/2011 | Carter | B22D 23/10 |
| | | | 164/513 |
| 2011/0226390 A1 * | 9/2011 | Chen | C22C 19/00 |
| | | | 148/527 |
| 2011/0274579 A1 * | 11/2011 | Arjakine | B23K 35/3033 |
| | | | 420/443 |
| 2012/0000890 A1 * | 1/2012 | Ito | B23P 6/007 |
| | | | 219/76.1 |
| 2012/0100030 A1 * | 4/2012 | Green | B22F 3/1039 |
| | | | 419/6 |
| 2012/0181255 A1 * | 7/2012 | Bruck | B23K 9/324 |
| | | | 219/73.2 |
| 2013/0136868 A1 | 5/2013 | Bruck et al. | |
| 2013/0316183 A1 * | 11/2013 | Kulkarni, Jr. | B23P 6/007 |
| | | | 428/557 |

FOREIGN PATENT DOCUMENTS

| | | | |
|---|---|---|---|
| RU | 2217266 | * | 11/2003 |
| WO | 2008098614 A1 | | 8/2008 |

* cited by examiner

FUNCTIONAL BASED REPAIR OF SUPERALLOY COMPONENTS

This application is a continuation-in-part of U.S. patent application Ser. No. 14/071,774 filed 5 Nov. 2013 This application is also a continuation-in-part of U.S. patent application Ser. No. 14/144,680 filed 31 Dec. 2013 , which in turn claimed benefit of the 31 Jan. 2013 filing date of U.S. provisional patent application No. 61/758,795 . This application is also a continuation-in-part of U.S. patent application Ser. No. 13/956,431 filed 1 Aug. 2013 , which in turn was a continuation-in-part of U.S. patent application Ser. No. 13/755,098 filed on 31 Jan. 2013 which in turn was a continuation-in-part of U.S. patent application Ser. No. 13/005,656 filed on 13 Jan. 2011.

FIELD OF THE INVENTION

This invention relates generally to the field of materials technologies, and more particularly to material additive processes, and in one embodiment to a process for performing a functionally based repair to a superalloy component.

BACKGROUND OF THE INVENTION

It is recognized that superalloy materials are among the most difficult materials to weld due to their susceptibility to weld solidification cracking and strain age cracking The term "superalloy" is used herein as it is commonly used in the art, ie, a highly corrosion and oxidation resistant alloy that exhibits excellent mechanical strength and resistance to creep at high temperatures Superalloys typically include a high nickel or cobalt content. Examples of superalloys include alloys sold under the trademarks and brand names Hastelloy, Inconel alloys (e.g., IN 738, IN 792, IN 939), Rene alloys (e.g, Rene N5, Rene 80, Rene 142), Haynes alloys, Mar M, CM 247, CM 247 LC, C263, 718, X-750, ECY 768, 282, X45, PWA 1483 and CMSX (eg, CMSX-4) single crystal alloys.

It is known to utilize selective laser melting (SLM) or selective laser sintering (SLS) to melt a thin layer of superalloy powder particles onto a superalloy substrate. The melt pool is shielded from the atmosphere by applying an inert gas, such as argon, during the laser heating These processes tend to trap the oxides (e.g., aluminum and chromium oxides) that are adherent on the surface of the particles within the layer of deposited material, resulting in porosity, inclusions and other defects associated with the trapped oxides Post process hot isostatic pressing (HIP) is often used to collapse these voids, inclusions and cracks in order to improve the properties of the deposited coating. The application of these processes is also limited to horizontal surfaces due to the requirement of pre-placing the powder Laser microcladding is a 3D-capable process that deposits a small, thin layer of material onto a surface by using a laser beam to melt a flow of powder directed toward the surface. The powder is propelled toward the surface by a jet of gas, and when the powder is a steel or alloy material, the gas is argon or other inert gas which shields the molten alloy from atmospheric oxygen. Laser microcladding is limited by its low deposition rate, such as on the order of 1 to 6 $cm^3/hr$ Furthermore, because the protective argon shield tends to dissipate before the clad material is fully cooled, superficial oxidation and nitridation may occur on the surface of the deposit, which is problematic when multiple layers of clad material are necessary to achieve a desired cladding thickness.

FIG. 1 is a conventional chart illustrating the relative weldability of various superalloys as a function of their aluminum and titanium content. Alloys such as Inconel® IN718 which have relatively lower concentrations of these elements, and consequentially relatively lower gamma prime content, are considered relatively weldable, although such welding is generally limited to low stress regions of a component Alloys such as Inconel® IN939 which have relatively higher concentrations of these elements are much more difficult to weld A dashed line 10 indicates a recognized upper boundary of a zone of weldability The line 10 intersects 3 wt. % aluminum on the vertical axis and 6 wt. % titanium on the horizontal axis. Alloys outside the zone of weldability are recognized as being very difficult to weld with traditional processes, and the alloys with the highest aluminum content are generally found to be the most difficult to weld, as indicated by the arrow

BRIEF DESCRIPTION OF THE DRAWINGS

The invention is explained in the following description in view of the drawings that show

DETAILED DESCRIPTION OF THE INVENTION

The repair of service-run superalloy gas turbine components has traditionally been restricted by the difficulty of weld repair of high alloy materials. United States Patent Application Publication No. US 2013/0136868 A1, incorporated by reference herein, discloses improved methods for depositing superalloy materials that are otherwise difficult to weld. Those methods include the laser melting of powdered superalloy material together with powdered flux material to form a melt pool under a layer of protective slag. The slag performs a cleaning function in addition to protecting the molten alloy material from the atmosphere. Upon solidification, the slag is removed from the newly deposited superalloy material to reveal a crack-free surface. Such methods have been shown to be effective even for superalloy materials which are beyond the traditional zone of weldability shown in FIG. 1

The present inventors now extend the capability described in United States Patent Application Publication No US 2013/0136868 A1 by disclosing methods wherein an additive superalloy material is deposited onto an original superalloy material such that the additive superalloy material has a property that is different from a counterpart property of the original superalloy material. The property that is changed between the original material and the additive material may be material composition, grain structure, principal grain axis, grain boundary strengthener, and/or porosity, as non-limiting examples. Moreover, the additive material itself may have a varying property across its volume, with all or only portions of the additive material being different than the original superalloy material. In some embodiments described more fully below, a property of the additive material may be selected in response to an expected environment in which the resulting component may be designed to operate.

Figure 2:
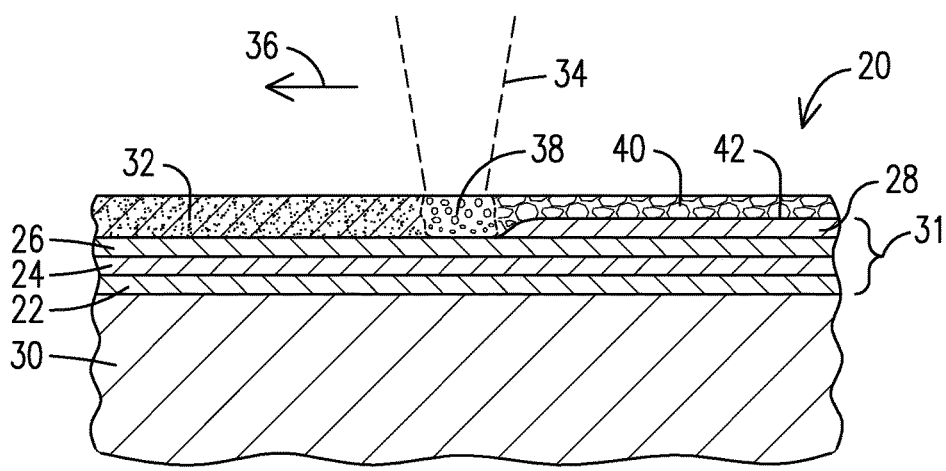
FIG. 2 is a cross-sectional view of a superalloy component undergoing a material addition process

FIG. 2 is a partial cross-sectional illustration of a superalloy component 20, which may be a gas turbine engine hot gas path component, for example, such as a blade, vane or combustor nozzle or burner Component 20 is illustrated as undergoing a material addition process wherein a plurality of layers 22, 24, 26, 28 of additive superalloy material has been deposited on an original superalloy material 30. One will appreciate that the original superalloy material 30 may be an original cast material from which the component 20 had been manufactured, or it may be a layer of material added to the component 20 during a previous repair or fabrication step.

FIG. 2 illustrates additive superalloy material layer 28 in the process of being deposited onto previously deposited layer 26, such as by a process similar to those described in United States Patent Application Publication No. US 2013/0136868 A1. In this example, a layer 32 of mixed powdered superalloy material and powdered flux material has been deposited onto layer 26 and is being melted by an energy beam such as laser beam 34 traversing across the layer 32 in the direction of arrow 36 The laser beam 34 melts the powders to form a melt pool 38 wherein a layer of slag material 40 floats to cover the layer of additive superalloy material 28. The melt pool 38 cools and solidifies behind the traversing 36 laser beam 34 The layer of slag 40 is then removed (not shown) by any convenient method, for example grit blasting, to reveal a new surface 42 of the additive superalloy material 28.

Figure 1:
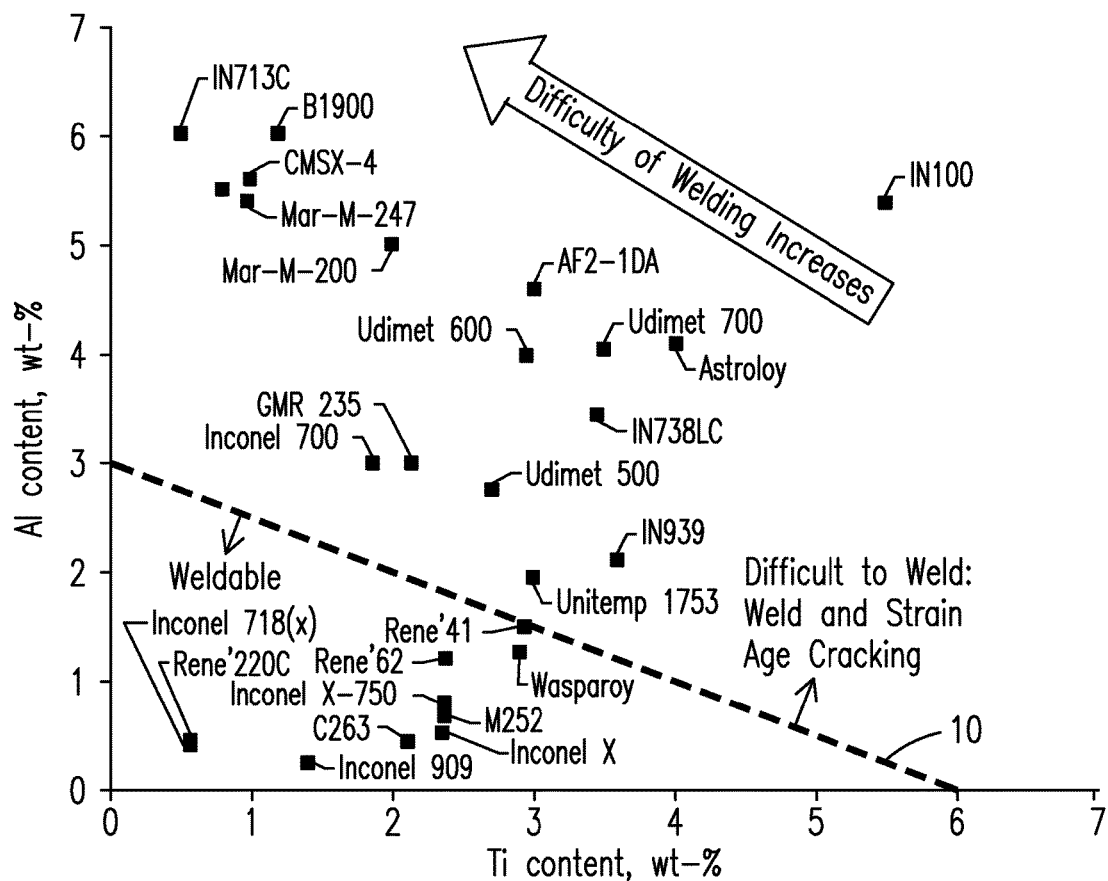
FIG. 1 is a conventional diagram illustrating the relative weldability of various superalloy materials

Prior art repair techniques for superalloy components were constrained in their selection of materials due to the propensity of such materials to crack, as described above The present inventors have recognized that it is now possible to tailor the properties of an additive superalloy material in order to improve or to optimize a performance characteristic of the resulting component. For example, in the gas turbine blade 50 illustrated in FIG. 3, the local hot gas path environment and the level of stress in the material of the blade 50 will vary across the root section 52, platform 54, and tip region 56 of the blade 50 during use of the blade in a gas turbine engine (not shown) By controlling a material deposition process such as illustrated in FIG. 2, the present inventors are now able to provide a repair that is responsive to such varying operational conditions, such as by providing more oxidation resistance in the tip region 56 and more corrosion and erosion resistance at the platform 54, for example. This improvement can be implemented during the original manufacturing of the blade 50 or during a repair activity where service induced cracks 58 in the original (typically cast) superalloy material are removed and the cracked material is replaced with an additive superalloy material that has a property that is different from a counterpart property of the original superalloy material. A region 60 of the blade platform 54 is illustrated as having been repaired in such a manner, with the repaired blade 50 now being able to provide improved performance during operation (such as number of hours before cracking develops, or resistance to erosion or corrosion, etc.) when compared to the originally manufactured blade If one envisions that the region 60 of FIG. 3 was repaired using a process as illustrated in FIG. 2, then the composition of the additive material, such as layer 22 of FIG. 2, is different from a composition of the original superalloy material 30 Moreover, there may be compositional variation across the volume of the additive material, such as when topmost additive material layers 26, 28 have a composition different from bottommost additive material layers 22, 24. The compositional variation across the volume of the additive material may alternatively or additionally be accomplished within a single layer, such as by varying the composition of deposited powdered material layer 32 across the surface of layer 26. Such variation may be accomplished by varying the composition of the powdered alloy material, the powdered flux material, or both. For example, additional powdered aluminum may be included in regions where higher oxidation resistance is desired And as the aluminum content is increased and the resulting superalloy becomes more susceptible to cracking, as illustrated in FIG. 1, the composition of the powdered flux material may be varied, such as by including more scavenger elements to reduce impurities in the resulting additive alloy.

In other embodiments, the grain structure of the additive superalloy material 22, 24, 26, 28 may be different than that of the original superalloy material 30. This is accomplished by controlling the process of solidification of the melt pool 38. For example, original superalloy material 30 may be conventionally cast with an equiaxed grain structure. However, in order to improve its strength along a predetermined axis, it may be desired to control the steps of melting, cooling and solidifying of the deposited additive material layers 22, 24, 26, 28 in order to develop a directionally solidified grain structure in the additive material. In the illustration of FIG. 2 with the direction of movement of the laser beam in direction 36, one may appreciate that the weld pool 38 is cooled primarily by the underlying alloy material, and that the resulting grain growth direction will be generally vertical However, because of the direction of movement, the grain growth direction will not be completely perpendicular to the underlying surface, but rather, it will be tilted by a few degrees off of vertical As the tilt tends to accumulate as a plurality of layers 22, 24, 26, 28 are applied, the material will tend to develop an equiaxed grain structure. Recognizing this phenomenon, the present inventors control the solidification conditions and the direction of movement 36 from layer to layer, such as by alternating the direction of movement by 180 degrees between layers, to maintain a directionally solidified grain structure in the resulting overall additive material volume By controlling heating and solidification variables with chill plates, heaters, and laser process controls, any desired additive material grain structure may be achieved over any original material grain structure, including controlling a principal grain axis of a directionally solidified additive superalloy material to be not parallel to a principal grain axis of a directionally solidified original superalloy material Other embodiments may include controlling a material addition process such that a porosity of the additive superalloy material is different from a porosity of the original superalloy material or other portions of the additive material volume This may be accomplished by including fugitive or hollow particles within the powdered material layer 32, for example A coefficient of thermal conductivity, coefficient of thermal expansion, hardness or wear property of the material may thus be varied, and may be further varied by the selective addition of graphite particles. Still another example includes locally strengthening the grain boundaries of a portion of the component such as by the addition of boron in the deposition process.

Figure 3:
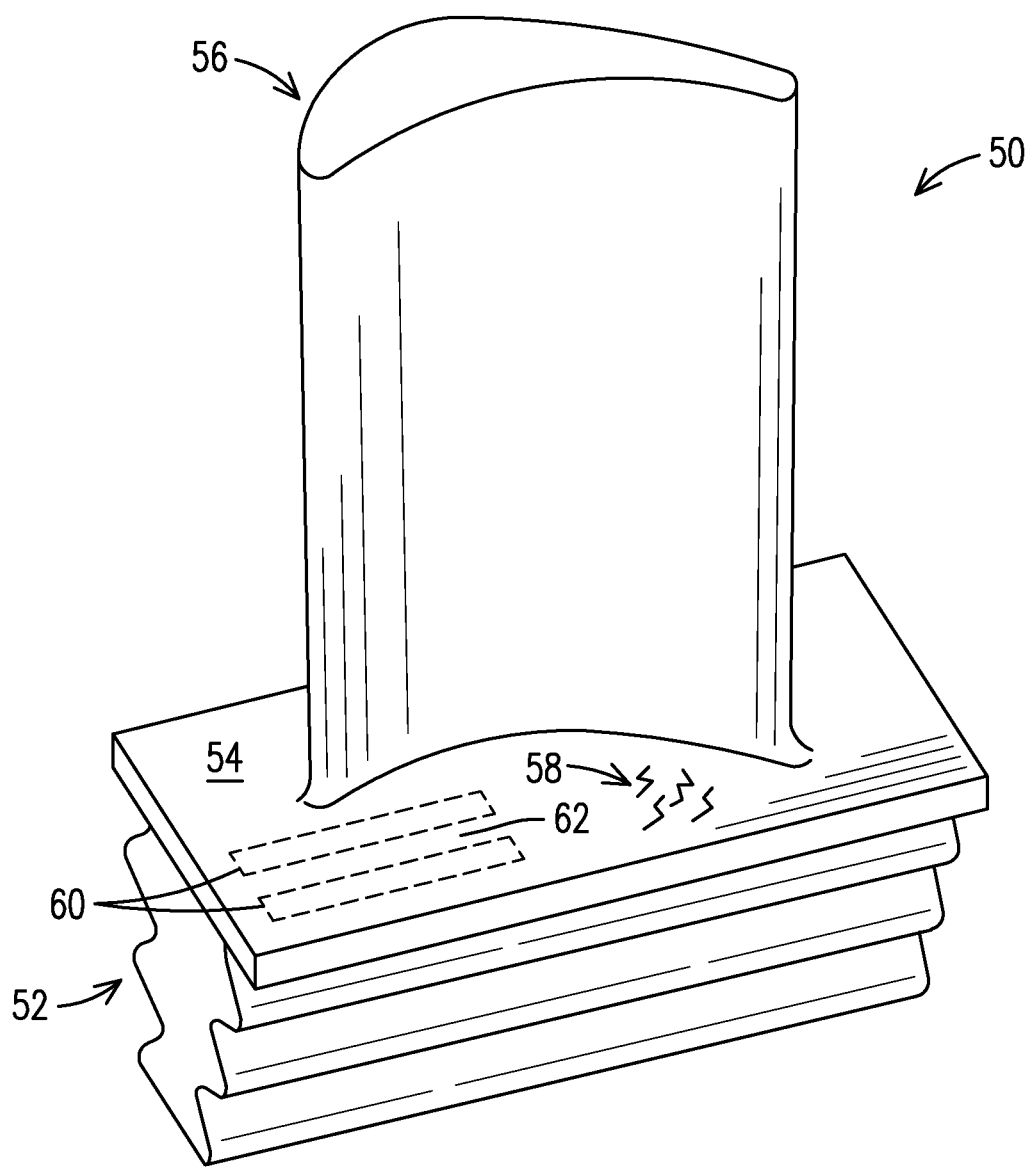
FIG. 3 is a perspective view of a gas turbine blade

A local increase in the coefficient of thermal expansion of the repaired regions 60 of the gas turbine blade 50 of FIG. 3 when compared with the surrounding original superalloy material in a remaining portion of the platform 54 will result in regions 60 expanding more than the surrounding material when the blade 50 is heated. As a result, the additive superalloy material and an adjacent region 62 of the original superalloy material (which may be important and otherwise crack-prone) will experience compressive forces when the blade 50 is returned to an elevated operating temperature environment in a gas turbine engine The resulting compressive stress will tend to mitigate the reoccurrence of cracks 58 in repaired region 60 and in its surrounding material 62 during subsequent operation. Locally increased coefficient of thermal expansion in at least the top 100 microns of the thickness of the platform 54 may be particularly useful in mitigating service induced crack formation and growth In one embodiment, a blade formed of alloy IN 939 may have a repair region 60 formed with alloy 825. Alloy 939 has a coefficient of thermal expansion of 14.0 in/in/K while alloy 825 has a coefficient of thermal expansion of 17.1 in/in/K. The resulting difference in thermal growth at operating temperature will tend to develop compressive stress in region 60 and in its surrounding material when the blade 50 is returned to service.

A repair regiment for a superalloy gas turbine component may now include the step of evaluating the performance of an original superalloy material upon removal of the component from the operating environment of a service-run gas turbine engine. Should the evaluation identify a service-limiting region of the component, it may be possible to identify a superalloy material having a property that is different from the counterpart property of the original superalloy material that would provide the component with improved performance in the engine. Likely, such material may have a composition that is above line 10 in FIG. 1 Such material can be applied as an additive material during a repair of the component in place of the original superalloy material using a process such as is illustrated in FIG. 2, or a replacement component can be so manufactured. The repaired or replacement component is then available for further service in the operating environment of the gas turbine engine.

In another embodiment, a gas turbine engine burner may be repaired or manufactured to have a burner tip with a superalloy composition responsive to a fuel type to be used in the engine Currently, gas turbine burner tips are typically replaced with Hast X alloy because of the ease of fabrication of that alloy It is now possible to customize the tip repair with an additive superalloy material that provides improved performance when exposed to high sulfur or other less desirable fuels.

While various embodiments of the present invention have been shown and described herein, it will be obvious that such embodiments are provided by way of example only Numerous variations, changes and substitutions may be made without departing from the invention herein.

The invention claimed is:

1. A method comprising:
   simultaneously melting powdered alloy material and powdered flux material on a surface of an original superalloy material to form a melt pool comprising a layer of slag covering an additive superalloy material;
   cooling and solidifying the melt pool; and
   removing the layer of slag to reveal a surface of the additive superalloy material;
   wherein the steps of melting and cooling and solidifying are performed such that the additive superalloy material has a property that is different from a counterpart property of the original superalloy material.

2. The method of claim 1, further comprising selecting the powdered alloy material and the powdered flux material such that a composition of the additive superalloy material is different from a composition of the original superalloy material.

3. The method of claim 1, further comprising controlling a direction of solidification during the step of cooling and solidifying such that a grain structure of the additive superalloy material is different from a grain structure of the original superalloy material.

4. The method of claim 1, wherein the original superalloy material comprises a directionally solidified material, and further comprising controlling a direction of solidification during the step of cooling and solidifying such that a principal grain axis of the additive superalloy material is not parallel to a principal grain axis of the original superalloy material.

5. The method of claim 1, further comprising performing the steps of melting and cooling and solidifying such that a porosity of the additive superalloy material is different from a porosity of the original superalloy material.

6. The method of claim 1, further comprising:
   repeating the steps of melting, cooling and solidifying, and removing slag for a plurality of times to build the additive superalloy material in a plurality of layers to a desired geometry; and
   performing the plurality of steps of melting, cooling and solidifying, and removing slag in a manner such that a first of the plurality of layers of the additive superalloy material has a property that is different from a counterpart property of a second of the plurality of layers of the additive superalloy material.

7. The method of claim 1, further comprising performing the steps of melting and cooling and solidifying in a manner responsive to an operational parameter associated with the original superalloy material, such that the different property of the additive superalloy material provides an improved performance compared to performance of the original superalloy material when exposed to the operational parameter.

8. The method of claim 1, further comprising selecting the powdered alloy material and the powdered flux material such that a composition of the additive superalloy material comprises a grain boundary strengthener different from the original superalloy material.

9. A method comprising:
   evaluating a performance of an original superalloy material in an operating environment;
   identifying an additive superalloy material comprising a property that is different from a counterpart property of the original superalloy material and that would provide the additive superalloy material with an improved performance in the operating environment when compared to the performance of the original superalloy material;
   simultaneously melting powdered alloy material and powdered flux material on a surface of the original superalloy material to form a melt pool comprising a layer of slag covering a layer of the additive superalloy material;
   cooling and solidifying the melt pool; and
   removing the layer of slag to reveal a surface of the additive superalloy material in anticipation of exposure to the operating environment.

10. The method of claim 9, further comprising selecting the powdered alloy material and the powdered flux material such that a composition of the additive superalloy material is different from a composition of the original superalloy material.

11. The method of claim 9, further comprising controlling a direction of solidification during the step of cooling and solidifying such that a grain structure of the additive superalloy material is different from a grain structure of the original superalloy material.

12. The method of claim 9, wherein the original superalloy material comprises a directionally solidified material, and further comprising controlling a direction of solidification during the step of cooling and solidifying such that a principal grain axis of the additive superalloy material is not parallel to a principal grain axis of the original superalloy material.

13. The method of claim 9, further comprising performing the steps of melting and cooling and solidifying such that a porosity of the additive superalloy material is different from a porosity of the original superalloy material.

14. The method of claim 9, further comprising selecting the powdered alloy material and the powdered flux material such that a composition of the additive superalloy material comprises a grain boundary strengthener different from the original superalloy material.

15. The method of claim 9, further comprising:
repeating the steps of melting, cooling and solidifying, and removing slag for a plurality of times to build the additive superalloy material in a plurality of layers to a desired geometry; and
performing the plurality of steps of melting, cooling and solidifying, and removing slag in a manner such that a first of the plurality of layers of the additive superalloy material has a property that is different from a counterpart property of a second of the plurality of layers of the additive superalloy material.

16. The method of claim 9, further comprising removing a degraded portion of the original superalloy material to reveal the surface of the original superalloy material.

17. The method of claim 9, further comprising:
removing a degraded portion of the original superalloy material from a remaining portion of the original superalloy material of a service run component to reveal the surface of the original superalloy material;
performing the steps of melting and cooling and solidifying such that a coefficient of thermal expansion of the additive superalloy material is different from a coefficient of thermal expansion of the original superalloy material such that the additive superalloy material and an adjacent region of the original superalloy material will experience compressive stresses when the component is returned to an elevated operating temperature environment.

18. The method of claim 9 applied to a gas turbine engine burner tip, and further comprising:
selecting the additive superalloy material in response to a fuel type used in the gas turbine engine; and
selecting the powdered alloy material and powdered flux material such that the steps of simultaneously melting, cooling and solidifying produce a burner tip of the additive superalloy material.

19. A method comprising:
simultaneously melting powdered alloy material and powdered flux material on a surface to form a melt pool comprising a layer of slag covering a layer of superalloy material;
cooling and solidifying the melt pool;
removing the layer of slag to reveal a surface of the superalloy material;
repeating the steps of melting, cooling and solidifying, and removing for a plurality of times to form a desired geometry of a superalloy component; and
controlling the steps of melting and cooling and solidifying in a manner effective to vary a property of the superalloy material across the geometry responsive to an anticipated operating environment of the superalloy component.

20. A superalloy component formed by the method of claim 19.

* * * * *